| United States Patent [19] | [11] Patent Number: 4,757,103 |
| Dozzi et al. | [45] Date of Patent: Jul. 12, 1988 |

[54] SELF-EXTINGUISHING POLYCARBONATE COMPOSITION

[75] Inventors: Giovanni Dozzi, Milan; Salvatore Cucinella, S. Donato Milanese; Giorgio Della Fortuna, Milan, all of Italy

[73] Assignee: Anic, S.p.A., Palermo, Italy

[21] Appl. No.: 921,847

[22] Filed: Oct. 23, 1986

Related U.S. Application Data

[63] Continuation of Ser. No. 500,861, Jun. 3, 1983, abandoned.

[30] Foreign Application Priority Data

Jun. 4, 1982 [IT] Italy ............................ 21699 A/82
Apr. 1, 1983 [IT] Italy ............................ 20426 A/83

[51] Int. Cl.⁴ ..................... C08K 5/41; C08K 5/34; C08K 5/09
[52] U.S. Cl. ........................... 524/99; 524/102; 524/171; 524/219; 524/394; 524/395; 524/396; 524/400; 524/411

[58] Field of Search .................. 524/99, 171, 219, 395, 524/396, 394, 400, 611, 102

[56] References Cited

U.S. PATENT DOCUMENTS

| 3,492,268 | 1/1970 | Baker | 524/462 |
| 3,535,001 | 10/1970 | Gable | 524/202 |
| 3,769,367 | 10/1973 | Factor | 524/396 |
| 3,836,490 | 9/1974 | Bockmann et al. | 524/611 |
| 3,876,580 | 4/1975 | Nouvertne et al. | 524/611 |
| 3,965,064 | 6/1976 | Mercier et al. | 524/611 |
| 4,098,754 | 7/1978 | Neuray et al. | 524/611 |

*Primary Examiner*—Veronica P. Hoke
*Attorney, Agent, or Firm*—Hedman, Gibson, Costigan & Hoare

[57] ABSTRACT

Self-extinguishing polycarbonates consisting of mixtures of polycarbonates with at least one salt of particular carboxylic organic compounds, said salt being of metals of Group I A and/or B, and/or Group II A and/or B of the Periodic Table of elements, and/or of ammonium.

10 Claims, No Drawings

SELF-EXTINGUISHING POLYCARBONATE COMPOSITION

This is a continuation of Ser. No. 500,861 filed June 3, 1983, now abandoned.

The literature describes various methods for making polycarbonates self-extinguishing. However, many of these have proved hardly satisfactory in that they have negative effects on the other polymer properties.

For example, the self-extinguishing property of polycarbonates can be improved by using relatively high levels of additives in the form of halogenated organic compounds either in synergism with antimony oxide or not (J. T. Howarth et al., Plastic World p. 64–74 March 1973). It has however been found that such additives lead to excessive degradation of the polycarbonates during their working (U.S. Pat. No. 3,334,154), leading to a deterioration in the main physical properties of the polymer (U.S. Pat. No. 4,153,595). It has also been proposed to use tetrahalogenated derivatives of bisphenol A as comonomers in the copolymerisation with bisphenol A, to give a polycarbonate which either in itself or mixed with a non-halogenated polycarbonate provides materials possessing greater flame resistance.

In this case it has also been reported that in order to attain good flame resistance, said polymer materials must contain very high halogen quantities (U.S. Pat. No. 4,046,836, U.S. Pat. No. 3,775,367, U.S. Pat. No. 4,100,130) which leads to: (i) a marked deterioration in their behaviour during working, so that the mechanical characteristics do not attain the level which is typical of the non-halogenated polycarbonate; (ii) evolvement of halogen or halogen acid under normal transformation conditions, leading to machinery corrosion; (iii) the development under combustion conditions of consistent quantities of halogenated degradation compounds, and in particular of halogen acids which can cause further damage by corroding the metal structures.

In the most recent inventions, the self-extinguishing property of polycarbonates is improved by adding small quantities of particular organic compounds such as alkaline or alkaline earth salts of aryl or alkylsulphonic acids or their derivatives (eg. U.S. Pat. No. 3,940,366; U.S. Pat. No. 3,933,734; U.S. Pat. No. 4,104,253; U.S. Pat. No. 4,153,195; U.S. Pat. No. 4,214,062).

The identification of the flame retardant activity of these particular compounds is the result of progressive experimental work conducted on various classes of organic compounds, which inter alia demonstrated the inadequateness of using carboxylic acid salts as flame retardants because of undesirable side effects, especially regarding the stability of the resin at processability temperatures.

It was also found that the incandescent dripping of polycarbonates during combustion (which must not occur in tests for classifying a material in the highest V-0 self-extinguishing level in accordance with the UL-94 standard of the Underwriters' Laboratories) could be prevented only if the carboxylic acid salts were used as flame retardants in union with glass fibre or with tetrabromo or tetrachloro bisphenol A resins (V. Mark, Organic Coatings and Plastics Chemistry vol. 43, Preprints of papers presented at the 2nd Chem. Congress of North American Continent, 1980, Aug. 24–29, San Francisco, page 71).

We have now found that salts of other carboxylic organic compounds or their mixtures, where said salts are of metals of Groups IA, IB, IIA or IIB of the Periodic Table of elements or of ammonium, improve the self-extinguishing property of polycarbonates without negatively influencing their thermal stability under transformation or application conditions, or the other properties peculiar to these polymers.

These carboxylic organic compounds satisfy general formula (I):

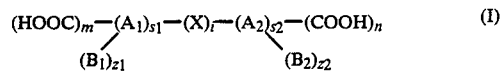

where $A_1$ and $A_2$, which can be the same or different, each represent a polycondensed benzene or aromatic, heterocyclic, cycloaliphatic or aliphatic radical.

$B_1$ and $B_2$, which can be the same or different, indicate groups which substitute part of the hydrogen atoms in $A_1$ and $A_2$ respectively, and can be halogen atoms or groups such as nitrile, nitro, sulpho, imido, ether, ester, ketone, acid halide, or alkyl, cycloalkyl, aryl or heterocyclic radical.

m and n, which can be the same or different, can individually vary from zero to five, but at least one of said values must be other than zero, as at least one carboxyl group must be present.

$s_1$ and $s_2$, which can be the same or different, can individually vary from zero to five, but at least one of said values must be other than zero, as at least one $A_1$ or $A_2$ radical must be present.

$z_1$ and $z_2$, which can be the same or different, can individually vary from zero to six.

i can be zero or one. When i is zero, the group X is absent. When the carboxylic organic compound of general formula (I) is salified with metal of Groups IA, IB, IIA or IIB of the Periodic Table of elements, X is a di or pluriradical which can be chosen from —S—; —S—S—; —SO—; —SO$_2$—; —SO$_2$SO$_2$—; —SO$_2$SO—; —SO$_2$S—; —O—; —CO—; —CS—; —OCOO—; —CONH—; —CONR—; —CONRCO—; >(CO)$_2$N—; —NH—CONH—; —NR—CO—NR—; —NH—CS—NH—; —NR—CS—NR—CONH—R—NHCO; —CONR$_1$—R—NR$_2$CO—; —NR$_1$—R—R$_2$N—; >N—R—N<; where R, $R_1$ and $R_2$, which can be the same or different, indicate a linear or branched aliphatic, cycloaliphatic, aryl including polycondensed, or heterocyclic radical, or a group of type

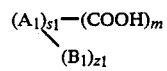

in which the symbols and indices have the aforesaid meanings. When the carboxylic organic compound of general formula (I) is salified with an amino group, X is a di or pluriradical which can be chosen from —CONH—R—NHCO; —CONR$_1$—R—NR$_2$CO—; —NR$_1$—R—R$_2$N—; or >N—R—N< where R, $R_1$, $R_2$ have the aforesaid meanings.

Preferred forms of the salts of carboxylic organic compounds of general formula (I) are:
potassium salt of p-nitrobenzoic acid
ammonium salt of p-nitrobenzoic acid
sodium salt of p-iodobenzoic acid
sodium salt of pyridine-3-carboxylic acid
magnesium salt of pyridine-3-carboxylic acid
potassium salt of phenyl-1,4-dicarboxylic acid potassium salt of phenyl-1,3,5-tricarboxylic acid
potassium salt of diphenyl-2,2'-dicarboxylic acid
potassium salt of diphenyl-4-chloro-2,2'-dicarboxylic acid
potassium salt of pyridine-2,3-dicarboxylic acid
sodium salt of pyridine-3,5-dicarboxylic acid
potassium salt of pyridine-2,6-dicarboxylic acid
sodium salt of pyridine-2,6-dicarboxylic acid
calcium salt of pyridine-2,6-dicarboxylic acid
ammonium salt of pyridine-2,6-dicarboxylic acid
potassium salt of N,N'-(bis paracarboxybenzoyl)-1,6-diaminohexanoic acid
ammonium salt of N,N'-(bis paracarboxybenzoyl)-1,6-diaminohexanoic acid
sodium salt of ethylenediaminotetracetic acid
potassium salt of ethylenediaminotetracetic acid
calcium salt of ethylenediaminotetracetic acid
potassium salt of trans-cyclohexane-1,4-dicarboxylic acid
sodium and ammonium salt of ethylenediaminotetracetic acid
potassium salt of phenyl-1,2,4,5-tetracarboxylic acid
sodium and calcium salt of ethylenediaminotetracetic acid
potassium salt of 2-benzenesulphon-5-chlorobenzoic acid
potassium salt of N-cyclohexyl-4-carboxyphthalimide
potassium salt of diphenylsulphon-4,4'-dicarboxylic acid
sodium salt of diphenylsulphon-4,4'-carboxylic acid
lithium salt of diphenylsulphon-4,4'-dicarboxylic acid
magnesium salt of diphenylsulphon-4,4'-dicarboxylic acid When the metal salts of Groups IA, IB, IIA or IIB of the Periodic Table of elements or the ammonium salts of carboxylic organic compounds of general formula (I) are used either alone or in mixture, they improve the self-extinguishing property of the polycarbonate, even when added in minimum quantity, up to the highest levels included in the UL-94 standard published by the "Underwriters' Laboratories" in bulletin 94, which classifies polymer materials as V-0, V-1 or V-2 according to their behaviour, as specified hereinafter.

They are used in a quantity equal to or less than a total of 3 phr, and preferably in a total quantity equal to or less than 0.5 phr. This addition is effective with any type of aromatic polycarbonate having a mean viscometer molecular weight of between 10,000 and 100,000 and preferably between 20,000 and 50,000, and in particular polycarbonates prepared by reacting an aromatic diol, for example bisphenol A [2,2-bis(4-hydroxyphenyl)propane] with a precursor of the carbonate group. Polycarbonate preparation by interfacial polycondensation is usually carried out in the presence of a molecular weight regulator, an acid acceptor and a catalyst. The carbonate group precursor generally used is carbonyl chloride, but use can be made of other halides, haloformates or carbonic acid esters in processes carried out in the absence of solvent. In addition to bisphenol A, the bisphenol used can be in the form of bis-(hydroxyphenyl)-alkanes such as bis-(4-hydroxyphenyl)-methane, 2,2-bis-(4-hydroxy-3-methylphenyl)-propane, hydroquinone, resorcinol or bis-(4-hydroxyphenyl)-p-diisopropylbenzene.

Polyfunctional aromatic compounds with at least three functional groups can be used to give branched polycarbonates.

Two or more bisphenols can also be used. The various products according to the present invention can be used as flame retardant agents not only for the linear carbonate but also for the branched carbonate, their mixtures or polymer blends containing polycarbonate. Moreover, the polycarbonate can also contain other additives such as pigments, thermo-oxidation stabilisers, lubricants, dyes, fillers, U.V. radiation absorbers etc.

All operational details will be apparent from reading the following examples, the purpose of which is to merely illustrate the invention without limiting its scope.

EXAMPLES 1-35

100 parts of aromatic polycarbonate prepared by reacting bisphenol A with phosgene are mixed with the additives given in Table 1.

The mixture of additives and polycarbonate, previously homogenised by grinding in a Retsch mill, is fed to an extruder heated to about 260° C., and the extrusion is then cooled and granulated.

The granules were moulded both by compression (285° C., 40 kg/cm$^2$) and by injection at about 300° C. to obtain test pieces of different types, namely test piece A (approximately 127×12.7×3.2 mm), test piece B (approximately 127×6.5×3.2 mm) and test piece C (approximately 65×55×3.2 mm).

The test pieces A, five for each formulation given in Table 1, are subjected to the flame behaviour test for classifying materials in accordance with the UL-94 standard of the "Underwriters' laboratories". By this procedure, the materials are classified as V-0, V-1 or V-2 respectively, on the basis of the results of the five test pieces and in accordance with the following criteria:

94 V-0: no test piece must have a combustion time exceeding 10 seconds after removal from the bunsen flame. The total combustion time for the five test pieces (ten ignitions) must not exceed 50 seconds. No test piece must allow inflamed particles to drip which ignite cotton wool placed vertically below the test piece at a distance of 305 mm.

94 V-1: no test piece must have a combustion time exceeding 30 seconds after removal from the bunsen flame. The total combustion time for the five test pieces (ten ignitions) must not exceed 250 seconds. No test piece must allow inflamed particles to drip which ignite cotton wool placed vertically below the test piece at a distance of 305 mm.

94 V-2: no test piece must have a combustion time exceeding 30 seconds after removal from the bunsen flame. The total combustion time for the five test pieces (ten ignitions) must not exceed 250 seconds. The test pieces can allow inflamed particles to drip which ignite cotton wool placed vertically below the test piece at a distance of 305 mm.

Moreover, the five test pieces must all pass the UL-94 test, otherwise they are classified on the basis of the behaviour of the worst test piece. For example, if one test piece has V-2 behaviour and the other four V-0 behaviour, all five test pieces are classified V-2. If a test piece continues to burn for more than 30 seconds after removal from the bunsen flame, it cannot be classified under UL-94, and is indicated in the present invention as a polymer which burns. The test pieces B are subjected to the flame behaviour test in accordance with ASTM D-2863-77, which correlates the flammability of a polymer material with the oxygen concentration of the atmosphere in which the sample is located. This correlation is expressed as LOI (Limiting Oxygen Index), ie the minimum percentage of oxygen capable of maintaining combustion of the test piece in a nitrogen-oxygen atmosphere which flows against the test piece from the bottom upwards. The test pieces C were used to measure light transmission, using a Gardner XL211 instrument. In order to better illustrate the present invention, Table 1 gives the results of measurements carried out on the polycarbonate as such, for reference purposes, and on the polycarbonate after adding the salts of carboxylic organic compounds in accordance with the present invention. Table 2 gives a technological evaluation of the polycarbonate as such, for reference purposes, and of some samples of polycarbonate to which the salts of carboxylic organic compounds of Table 1 have been added.

TABLE 1

| Ex. | ADDITIVE (phr) |
|---|---|
| R | Reference (polycarbonate without additive) |
| 1. | Potassium salt of p-nitrobenzoic acid (0.035) |
| 2. | Ammonium salt of p-nitrobenzoic acid (0.25) |
| 3. | Sodium salt of p-iodobenzoic acid (0.06) |
| 4. | Sodium salt of pyridine-3-carboxylic acid (0.06) |
| 5. | Magnesium salt of pyridine-3-carboxylic acid (0.1) |
| 6. | Potassium salt of phenyl-1,4-dicarboxylic acid (0.07) |
| 7. | Potassium salt of phenyl-1,3,5-tricarboxylic acid (0.05) |
| 8. | Potassium salt of diphenyl-2,2'-dicarboxylic acid (0.05) |
| 9. | Potassium salt of diphenyl-4-chloro-2,2'-dicarboxylic acid (0.05) |
| 10. | Potassium salt of pyridine-2,3-dicarboxylic acid (0.06) |
| 11. | Sodium salt of pyridine-3,5-dicarboxylic acid (0.70) |
| 12. | potassium salt of pyridine-2,6-dicarboxylic acid (0.025) |
| 13. | Sodium salt of pyridine-2,6-dicarboxylic acid (0.1) |
| 14. | Calcium salt of pyridine-2,6-dicarboxylic acid (0.2) |
| 15. | Ammonium salt of pyridine-2,6-dicarboxylic acid (0.2) |
| 16. | Potassium salt of pyridine-2,6-dicarboxylic acid (0.018) + potassium salt of p-nitrobenzoic acid (0.005) |
| 17. | Potassium salt of N,N'—(bis paracarboxybenzoil)-1,6-diaminohexanoic acid (0.07) |
| 18. | Ammonium salt of N,N'-(bis paracarboxybenzoil)-1,6-diaminohexanoic acid (0.1) |
| 19. | Sodium salt of ethylenediaminotetracetic acid (0.02) |
| 20. | Potassium salt of ethylenediaminotetracetic acid (0.018) |
| 21. | Calcium salt of ethylenediaminotetracetic acid (0.5) |
| 22. | Potassium salt of phenyl-1,2,4,5-tetracarboxylic acid (0.08) |
| 23. | Sodium and calcium salt of ethylenediaminotetracetic acid (0.035) |
| 24. | Sodium and ammonium salt of ethylenediaminotetracetic acid (0.04) |
| 25. | Potassium salt of ethylenediaminotetracetic acid (0.015) + potassium salt of pyridine-2,6-dicarboxylic acid (0.01) |
| 26. | Potassium salt of trans-cyclohexane-1,4-dicarboxylic acid (0.05) |

| Example | Additive (phr) | Total combustion time for 5 test pieces (10 ignitions) (seconds) | Max. combustion time per test piece (2 ignitions (seconds) |
|---|---|---|---|
| R | Reference (polycarbonate without additive) | >250 | 60 |
| 27 | Potassium salt of 2-benzenesulphon-5-chlorobenzoic acid (0.1) | 26 | 7 |
| 28 | Potassium salt of N—cyclohexyl-4-carboxyphthalimide (0.1) | 43 | 14 |
| 29 | Potassium salt of diphenylsulphon-4,4'-dicarboxylic acid (0.025) + potassium salt of N—cyclohexyl-4-carboxyphthalimide (0.05) | 32 | 9 |
| 30 | Potassium salt of diphenylsulphon-4,4'-dicarboxylic acid (0.05) | 35 | 10 |
| 31 | Sodium salt of diphenylsulphon-4,4'-dicarboxylic acid (0.05) | 26 | 9 |
| 32 | Lithium salt of diphenylsulphon-4,4'-dicarboxylic acid (0.1) | 39 | 15 |
| 33 | Magnesium salt of diphenylsulphon-4,4'-dicarboxylic acid (0.1) | 55 | 20 |
| 34 | Sodium salt of 4-benzenesulphonbenzoic acid (0.03) | 61 | 18 |
| 35 | Zinc salt of diphenylsulphon-4,4'-dicarboxylic acid (0.05) | 87 | 25 |

| Ex. | Total combustion time for 5 test pieces (10 ignitions) (seconds) | Maximum combustion time per test piece (2 ignitions) (seconds) | Number of inflamed drips per 5 test pieces which ignite cotton wool | UL-94 classification | LOI % | MFI (300° C.; 1.2 kg) g/10 minutes | transmitted light % |
|---|---|---|---|---|---|---|---|
| R. | 250 | 74 | 7 | burns | 26 | 5.8 | 88.9 |
| 1. | 34 | 8 | 0 | V-0 | 35 | 8.2 | 88.4 |
| 2. | 98 | 22 | 4 | V-2 | 30 | 5.9 | 88.7 |
| 3. | 53 | 17 | 0 | V-1 | 35 | 7.8 | 87.4 |
| 4. | 48 | 14 | 0 | V-1 | 35 | 7.7 | 88.0 |
| 5. | 106 | 24 | 4 | V-2 | 32 | 6.0 | 84.1 |
| 6. | 45 | 12 | 0 | V-1 | 36 | 6.8 | 87.4 |
| 7. | 56 | 16 | 0 | V-1 | 34 | 8.0 | 87.1 |
| 8. | 40 | 9 | 0 | V-0 | 35 | 7.2 | 88.1 |
| 9. | 36 | 9 | 0 | V-0 | 35 | 7.1 | 87.6 |
| 10. | 42 | 10 | 0 | V-0 | 37 | 6.4 | 87.3 |
| 11. | 24 | 6 | 0 | V-0 | 38 | 6.5 | 86.9 |
| 12. | 39 | 10 | 0 | V-0 | 34 | 6.0 | 88.4 |
| 13. | 22 | 5 | 0 | V-0 | 39 | 6.5 | 87.7 |

TABLE 1-continued

| Ex. | | | | UL-94 classification | LOI % | MFI (300° C., 1.2 kg) g/10 minutes | tranmitted light % |
|---|---|---|---|---|---|---|---|
| 14. | 112 | 26 | 3 | V-2 | 33 | 6.2 | 85.0 |
| 15. | 131 | 28 | 4 | V-2 | 30 | 6.3 | 88.1 |
| 16. | 37 | 9 | 0 | V-0 | 35 | 6.1 | 88.5 |
| 17. | 95 | 21 | 2 | V-2 | 31 | 6.0 | 88.6 |
| 18. | 98 | 25 | 2 | V-2 | 31 | 5.8 | 88.8 |
| 19. | 18 | 4 | 0 | V-0 | 36 | 6.7 | 88.9 |
| 20. | 20 | 4 | 0 | V-0 | 36 | 6.4 | 88.9 |
| 21. | 101 | 23 | 1 | V-2 | 32 | 5.8 | 83.7 |
| 22. | 38 | 10 | 0 | V-0 | 37 | 7.6 | 86.0 |
| 23. | 29 | 6 | 0 | V-0 | 37 | 5.9 | 85.3 |
| 24. | 34 | 8 | 0 | V-0 | 35 | 6.4 | 88.5 |
| 25. | 18 | 4 | 0 | V-0 | 36 | 6.1 | 88.4 |
| 26. | 39 | 9 | 0 | V-0 | 36 | 6.1 | 87.5 |

| Ex. | Number of inflamed drips per 5 test pieces which ignite cotton wool | UL-94 classification | LOI % | MFI (300° C., 1.2 kg) g/10 minutes | tranmitted light % |
|---|---|---|---|---|---|
| R | 10 | burns | 26 | 11.0 | 86.0 |
| 27 | 0 | V-0 | 39 | 13.8 | 84.6 |
| 28 | 0 | V-I | 38 | 12.0 | 85.8 |
| 29 | 0 | V-0 | 38 | 11.6 | 85.5 |
| 30 | 4 | V-2 | 36 | 11.1 | 85.2 |
| 31 | 3 | V-2 | 36 | 11.2 | 85.0 |
| 32 | 3 | V-2 | 34 | 11.6 | 80.4 |
| 33 | 4 | V-2 | 33 | 11.1 | 80.0 |
| 34 | 2 | V-2 | 34 | 13.7 | 84.0 |
| 35 | 4 | V-2 | 31 | 11.3 | 79.6 |

TABLE 2

| Ex. | Thermal stability[a] at 300° C. Δ% MFI (300° C.; 1.2 kg) after 60 minutes | Izod impact ductile/fragile transit °C. | Vicat 1 kg °C. | HDT °C. | Flexure | | Traction | | |
|---|---|---|---|---|---|---|---|---|---|
| | | | | | Elastic mod. MPa | Max. load MPa | Yield strength MPa | U.T.S. MPa | Elong. % |
| Ref. | 24.3 | −30 | 158 | 130 | 2264 | 94 | 60 | 66 | 125 |
| 11 | 13.5 | −35 | 158 | 130 | 2307 | 95 | 60 | 65 | 124 |
| 13 | 12.1 | −25 | 158 | 130 | 2341 | 95 | 60 | 67 | 127 |
| 20 | 14.3 | −25 | 157 | 130 | 2330 | 96 | 60 | 64 | 120 |
| 26 | 7.2 | −25 | 157 | 130 | 2285 | 95 | 60 | 65 | 124 |

[a]Thermal stability expressed as $\frac{MFI(t = 60) - MFI(t = 0)}{MFI(t = 0)}$

We claim:

1. A self-extinguishing halogen-free polycarbonate composition consisting of a polycarbonate-resin base and as a flame-retardant an organic metal salt selected from the group consisting of the sodium salt of pyridine-3-carboxylic acid; the magnesium salt of pyridine-3-carboxylic acid; the potassium salt of biphenyl-2,2'bicarboxylic acid; the potassium salt of pyridine-2,6-bicarboxylic acid; the calcium salt of pyridine-2,6-bicarboxylic acid; the ammonium salt of pyridine-2,6-bicarboxylic acid; the potassium salt of biphenylsulphone-4,4'bicarboxylic acid; the sodium salt of biphenylsulphone-4,4'-bicarboxylic acid; the lithium salt of biphenylsulphone-4,4'bicarboxylic acid; and the magnesium salt of biphenylsulphone-4,4'-bicarboxylic acid.

2. A composition according to claim 1, characterized in that said organic metal salt is the sodium salt of the pyridine-3-carboxylic acid.

3. A composition according to claim 1, characterized in that said organic metal salt is the magnesium salt of the pyridine-3-carboxylic acid.

4. A composition according to claim 1, characterized in that said organic metal salt is the potassium salt of the biphenyl-2,2'-bicarboxylic acid.

5. A composition according to claim 1, wherein said organic metal salt is the potassium salt of the pyridine-2,3-bicarboxylic acid.

6. A composition according to claim 1, wherein said organic metal salt is the sodium salt of the pyridine-2,6-bicarboxylic acid.

7. A composition according to claim 1, wherein said organic metal salt is the potassium salt of the pyridine-2,6-bicarboxylic acid.

8. A composition according to claim 1, wherein said organic metal salt is the potassium salt of the biphenylsulphone-4,4'-bicarboxylic acid.

9. A composition according to claim 1, wherein said organic metal salt is the sodium salt of the biphenylsulphone-4,4'-bicarboxylic acid.

10. A composition according to claim 1, wherein said organic metal salt is the lithium salt of the biphenylsulphone-4,4'-bicarboxylic acid.

* * * * *